United States Patent
Meyer (10) Patent No.: US 8,352,184 B2
(45) Date of Patent: Jan. 8, 2013

(54) MESSAGE FORMATTING SYSTEM TO IMPROVE GPS AND IMU POSITIONAL REPORTING FOR A VEHICLE

(75) Inventor: Steven J. Meyer, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1361 days.

(21) Appl. No.: 11/650,756

(22) Filed: Dec. 21, 2006

(65) Prior Publication Data
US 2008/0154501 A1 Jun. 26, 2008

(51) Int. Cl.
*G01S 19/47* (2010.01)
(52) U.S. Cl. ........ 701/518; 701/468; 701/469; 701/472; 701/478; 701/500; 701/501
(58) Field of Classification Search ................ 701/1, 14, 701/200, 213, 220, 221; 342/357.12, 357.14
See application file for complete search history.

(56) References Cited

U.S. PATENT DOCUMENTS

| | | | |
|---|---|---|---|
| 6,564,146 B1 * | 5/2003 | Meyer et al. ............... 701/213 |
| 6,664,529 B2 * | 12/2003 | Pack et al. ............... 250/208.1 |
| 6,744,401 B2 * | 6/2004 | Hager et al. ............... 342/173 |
| 6,803,878 B2 * | 10/2004 | Hager et al. ............... 342/173 |
| 7,043,343 B1 * | 5/2006 | Houlberg et al. ............... 701/1 |
| 7,183,970 B1 * | 2/2007 | Houlberg et al. ............ 342/357.57 |
| 7,228,465 B1 * | 6/2007 | Hedger ............... 714/701 |
| 7,271,628 B2 * | 9/2007 | Cowles ............... 327/108 |
| 7,289,875 B2 * | 10/2007 | Recktenwald et al. ....... 700/213 |
| 7,639,181 B2 * | 12/2009 | Wang et al. ............ 342/357.59 |
| 2005/0108261 A1 * | 5/2005 | Glassy et al. ............... 707/100 |
| 2006/0071851 A1 * | 4/2006 | Graas et al. ............ 342/357.14 |
| 2007/0266884 A1 * | 11/2007 | Finneral et al. ............. 102/489 |
| 2008/0253225 A1 * | 10/2008 | Welker et al. ............... 367/17 |

* cited by examiner

*Primary Examiner* — Mary Cheung
*Assistant Examiner* — Jerrah Edwards
(74) *Attorney, Agent, or Firm* — David S. Kalmbaugh; Christopher L. Blackburn (57) ABSTRACT

The invention generally relates to a system for generating and transmitting a telemetry formatted message containing raw Global Positioning System (GPS) information, processed Inertial Measurement Unit (IMU) information corresponding to the position and attitude of a high speed vehicle in motion. This telemetry formatted message is received on the ground and used to improve Kalman filter operation. In particular, the telemetry formatted message is used as an input to a ground based Kalman filter that is set to track and predict the trajectory of the high speed vehicle. The telemetry formatted message content improves the overall operation of the Kalman filter by preventing Kalman filter resets that occur when a bit error is encountered in the IMU data and improves the time correlation of high data rate IMU information and low data rate GPS information, both necessary for accurate tracking of the high speed vehicle.

13 Claims, 5 Drawing Sheets

MESSAGE FORMATTING SYSTEM TO IMPROVE GPS AND IMU POSITIONAL REPORTING FOR A VEHICLE

BACKGROUND OF THE INVENTION

1. Field of the Invention

The invention generally relates to a system for generating and transmitting a telemetry formatted message containing raw Global Positioning System (GPS) positional information, processed Inertial Measurement Unit (IMU) attitude information corresponding to a vehicle experiencing high dynamic motion. In addition to GPS and IMU information, events tagged with GPS time are formatted for telemetry output to a ground receiving station. The GPS and IMU telemetry formatted message is received by the ground receiving station and used to improve Kalman filter operation. In particular, the GPS and IMU telemetry formatted message is used as an input to a ground based Kalman filter that is set to track and predict the trajectory of the vehicle, necessary for fast tracking acquisition. The GPS and IMU telemetry formatted message content improves the overall operation of the Kalman filter by preventing Kalman filter resets that occur when a bit error is encountered in IMU data and improves the time correlation of high data rate IMU information and low data rate GPS information, both necessary for accurate tracking of the vehicle experiencing high dynamic motion.

2. Description of the Prior Art

Historically, time, space, position information (TSPI) information was obtained from radar tracking data, laser tracking data and optical tracking data. Global Positioning System (GPS) instrumentation systems have been developed and are widely used to derive TSPI data from GPS information transmitted from a vehicle and received by a ground station. TSPI data is derived by processing the GPS information and feeding vehicle positional updates into a Kalman filter which derives a track and a trajectory prediction for the vehicle.

Another method to obtain an even higher degree of accuracy in reported positional information requires the high speed vehicle to transmit raw GPS data and raw IMU data to a ground receiving station where ground based signal processing can be applied to time correlate the GPS and IMU data. Once time-correlated the GPS and IMU data may be used as an input to a Kalman filter for tracking and trajectory prediction. One disadvantage to correlating the IMU and GPS data and then feeding them concurrently into a Kalman filter is that an IMU bit error will reset the Kalman filter. Multiple IMU bit errors inducing multiple wait states in the Kalman filter degrades tracking accuracy. Another disadvantage of combining GPS and IMU data is the inherent difficulty in time correlating the high rate IMU data with the low rate GPS data at the receiving station.

This invention presents a solution to the problems of degrading tracking accuracy in the presence of IMU bit errors overcomes the inherent difficulty in time correlating GPS and IMU data by implementing an onboard vehicle message formatting system to improve ground station tracking accuracy derived by a Kalman filter. This improved tracking accuracy provides faster tracking acquisition time for a vehicle in high dynamic motion.

SUMMARY OF THE INVENTION

The preferred embodiment is a message formatting system that is compact, lightweight, consumes a low amount of power and can be configured to operate in a small high speed vehicle such as a missile. The message formatting system combines raw Global Positioning System (GPS) information, processed Inertial Measurement Unit (IMU) information, system status information and event marker type information corresponding to the position and attitude of a high speed vehicle. System status is a report of the health and proper operation of the subsystems that are required for the formatting system to operate properly. An event marker is a GPS time tagged indication that a specific action has occurred or has failed to occur. In the preferred embodiment, a high speed vehicle transmits a radio frequency (RF) telemetry (TM) stream to an existing receiving station where each individual message in the RF telemetry stream contains the raw GPS measurements, the processed IMU data and the status word combined into a message called time space position information unit message structure (TUMS). The information in the transmitted TUMS message represents the current position and attitude of the high speed vehicle. The TUMS message is received by an existing TM ground station and is used as an input to a standard Kalman filter that is set to perform a tracking operation and also set to predict the trajectory of the high speed vehicle.

The TUMS message content improves the overall operation of the Kalman filter by preventing repeated Kalman filter resets that occur when a bit error is encountered in the high rate IMU data telemetered to the ground receiving station. Increases in the stability of the tracking data and increases in the accuracy of the trajectory predictions generated at the ground station are generally attributed to the uninterrupted operation of the Kalman filter. A key feature of the TUMS message content is the improved time correlation of the IMU and GPS data necessary for accurate tracking of the high speed vehicle. This improved time correlation is due to a unique algorithm that integrates the attitude measurements for the IMU and time correlates them to the GPS positional information received by the vehicle when in motion. Over time the algorithm provides a series of stable and correlated relative position reports that serve as the input to the standard Kalman filter. The algorithm also compresses the correlated positional information sent to the existing receiving station and reduces the overall TM data rate, increasing the overall tracking system efficiency at the existing receiving station.

DETAILED DESCRIPTION OF THE PREFERRED EMBODIMENT

A TUMS message follows Inter-Range Instrumentation Group, IRIG-106 Part II specification for packet telemetry. This allows the TUMS message to be a packet of data formatted for a packet telemetry system or embedded in a standard PCM data stream as an asynchronous data stream that can be de-commutated to create the TUMS packet on the ground. The preferred embodiment is a TUMS message formatted for a packet telemetry system.

Figure 1:
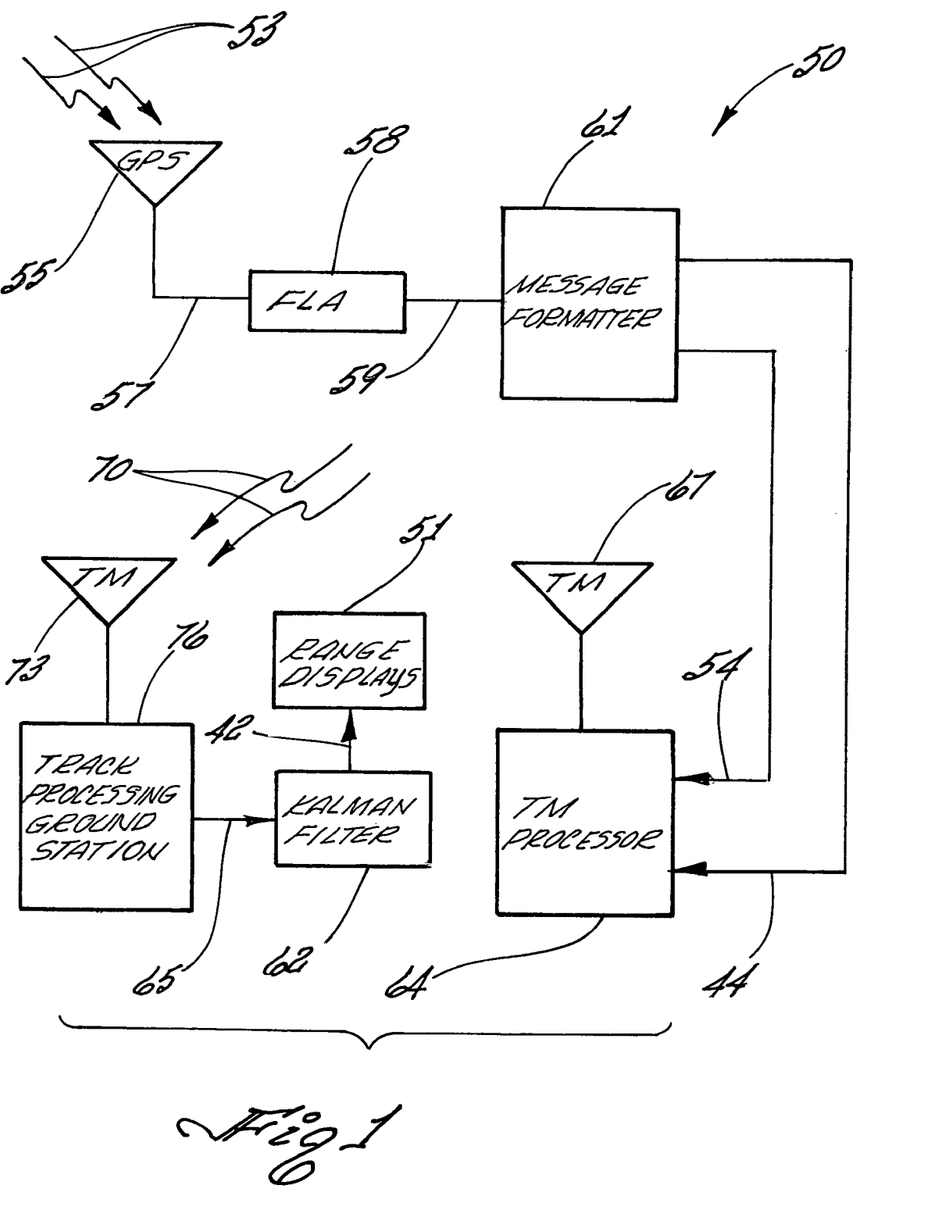
FIG. 1 is a drawing of a General Tracking System that includes the Message Formatter comprising the invention.
Figure 2:
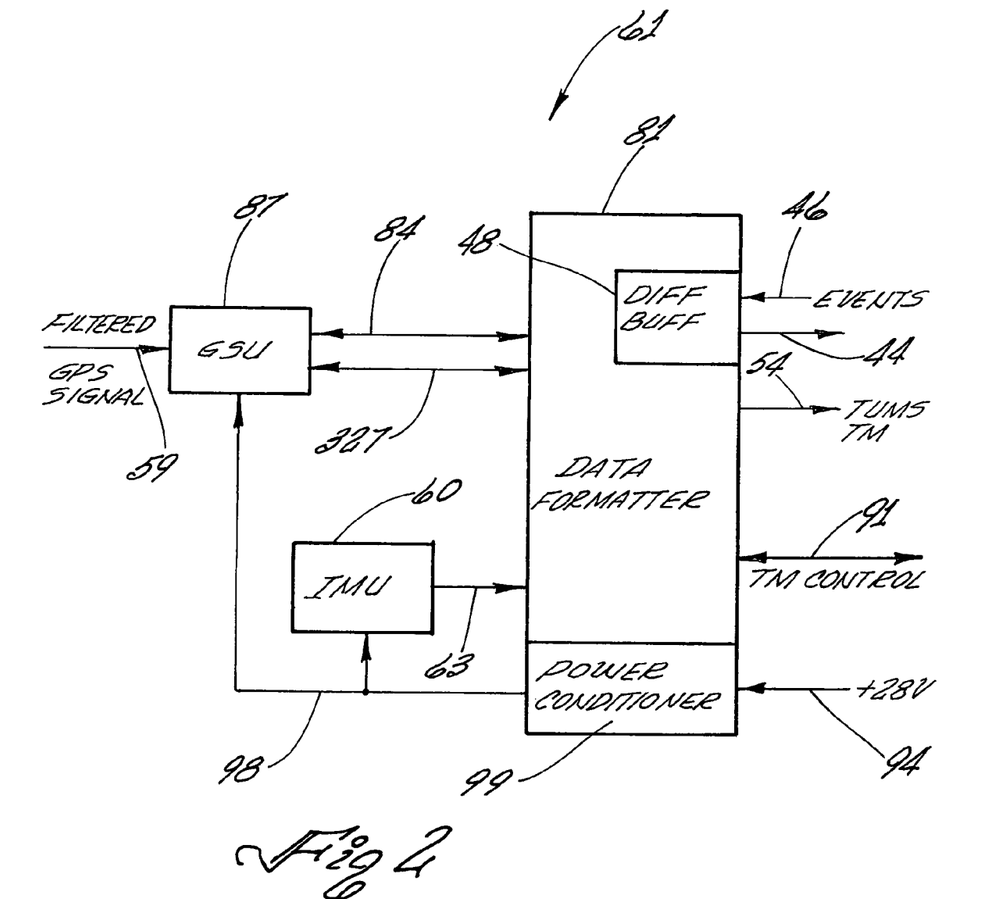
FIG. 2 is a Block Diagram of the Message Formatter with the input and output signals identified.

Referring to FIGS. 1 and 2, a general tracking system 50 is composed of Global Positioning System (GPS) signals 53 received by a GPS antenna 55 which serves as the input 57 to a Filter Limiter Amplifier (FLA) 58. The FLA 58 contains a filter and an amplifier with a gain of 25 decibels in a single unit. The filter portion of the FLA 58 prevents the amplifier portion of the FLA 58 from being driven into saturation when confronted with an input GPS signal 57 of high strength and filters out interfering telemetry transmitted RF signals. An inertial measurement unit (IMU) 60 (FIG. 2) provides measurements that represent the angular rates and acceleration of the vehicle to which the IMU 60 is attached. Angular rate and linear acceleration data is commonly known as attitude information. The IMU data 63 is fed into a Data Formatter 81 for further processing. The message formatter 61 creates the time space position information unit message structure (TUMS) that is the core of this invention.

Referring to FIG. 1 TUMS 54 is an input to the telemetry (TM) processor 64 that is coupled to a TM antenna 67 to facilitate radiation of the TUMS 54 and other TM data via RF signals 70 to the receiving station's TM antenna 73. The output of the receiving antenna 73 is coupled to an existing track processing ground station 76 which is connected to and feeding 65 a standard Kalman filter 62. The Kalman filter 62 is the device that hosts the algorithm that calculates the present position and predicted trajectory of the moving vehicle. The present position and predicted trajectory calculated by the Kalman filter are fed 42 to user range displays 51.

Referring to FIGS. 1 and 2, the block diagram of the message formatter 61 (illustrated in FIG. 1) depicts the essential control signals 91 for handshaking and program reconfiguration. The core of the message formatter 61 is the data formatter 81. The data formatter 81 accepts input and output signals 84 from a GPS Sensor Unit (GSU) 87. The GSU 87 is the primary unit for processing the filtered and amplified GPS signal 59, where GPS signal 59 of FIG. 1 is identical to GPS signal 59 in FIG. 2. The data formatter 81 also accepts an output signal 63 from the IMU 60 containing high data rate information that corresponds to angular rates and acceleration of the vehicle. The Data Formatter 81 outputs the TUMS messages in a data set 54 that the Message Formatter 61 feeds the TM processor 64 (FIG. 1). The TM processor 64 combines the TUMS message data set 54 with the event marker and other vehicle information 44 (FIG. 1) for transmission via RF signals 70 to the ground receiving station 76. The event markers are incoming events 46 (FIG. 2) time tagged with GPS time and are related to any internal vehicle state change, any external input sensed by the vehicle or any other information that is available and transmitted to the TM ground station 76 (FIG. 1) for monitoring. Referring to FIG. 2, the incoming events 46 serve as an input to a differential buffer 48. The buffered event signal 44 is connected to the TM processor 64 for transmission to the track processing ground station 76, as shown in FIG. 1.

Referring to FIG. 2, an input power waveform 94 that is nominally positive 28 Volts is connected directly to a Power Conditioner 99 that is integral to the Data Formatter 81. The input power 94 is converted by power conditioner 99 to other voltages that are used to supply power 98 via power lines to the GSU 87, to the IMU 60 and to the standard electrical components and electronic circuits integral to Data Formatter 81 as illustrated in FIG. 3.

Figure 3:
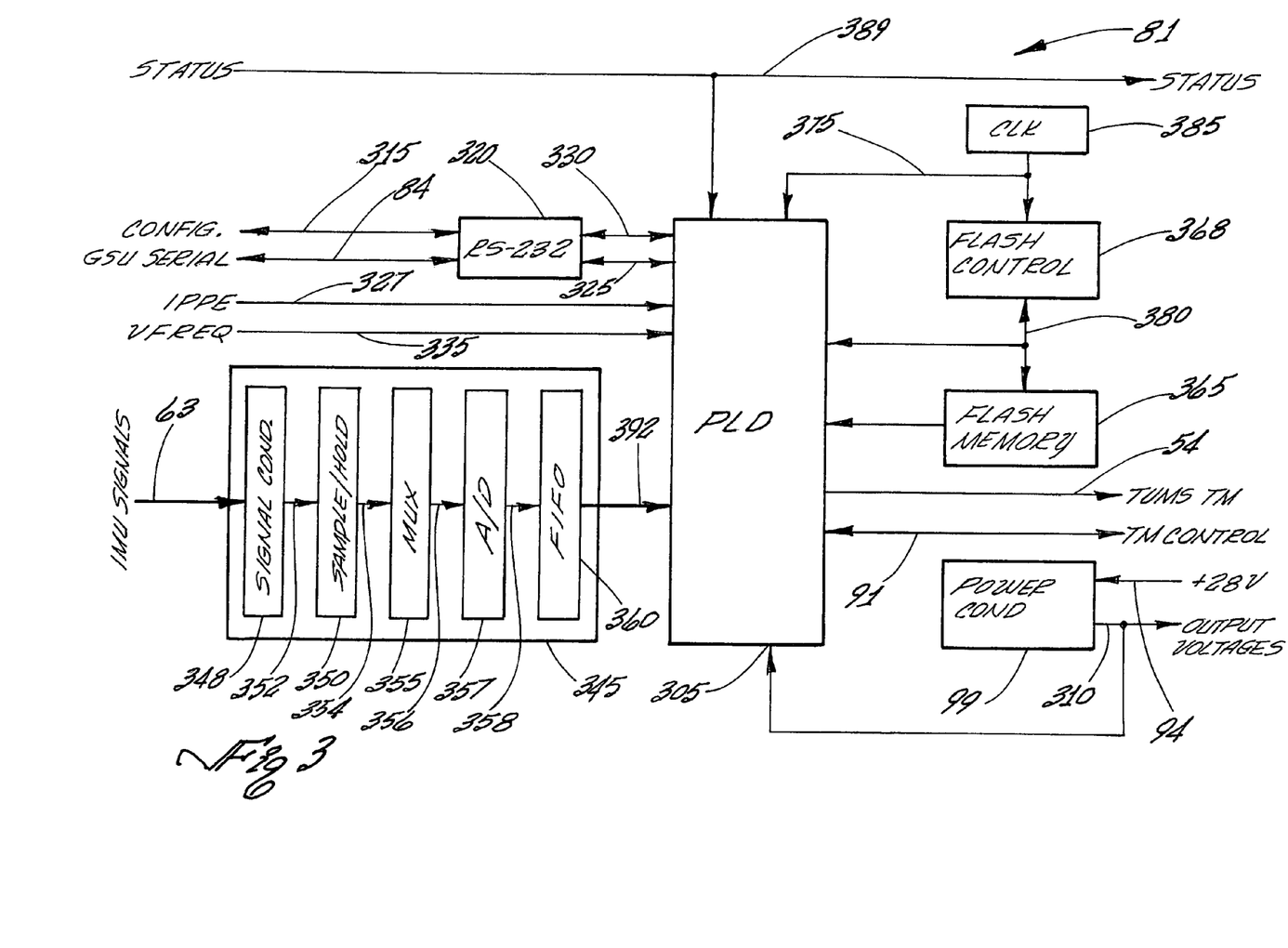
FIG. 3 is a Data Formatter Internal Block Diagram that depicts the interface and signals a Programmable Logic Device uses to build a TUMS.

The power conditioner 99 of FIG. 3, which is identical to the power conditioner 99 in FIG. 2, supplies a number of output voltages 310 routed to various systems and components. The output voltages 310 are positive and negative 5 Volts Direct Current (VDC) for the standard electronic circuits, a positive 3.3 VDC for developing logic level signals, a positive 1.8 VDC for the standard electronic circuits, a positive 21 VDC to power both the IMU 60 and the GSU 87 (FIG. 1). The input voltage 94 must conform to the input voltage specified by the manufacturer of power conditioner 99. The output voltages 310 available from the power conditioner 99 must be compatible with the components and electronic circuits selected for use in constructing the Message Formatter 61.

An internal block diagram of the Data Formatter 81 is shown in FIG. 3. The preferred embodiment uses a system on a programmable chip, also known as a programmable logic device (PLD) 305, made by the Altera Corporation of San Jose, Calif. and drawn from their Stratix family of devices. The Stratix PLD 305 is the preferred device to use as a data formatting processor due to the inherent programming flexibility, the robustness of an internal soft-core processor, the size and speed of internal random access memory (RAM), the size and speed of internal read only memory (ROM), a number of available interrupt request (IRQ) ports and the variety and quantity of external interface circuits offered within PLD 305. PLD 305 serves as the central processor for receiving, buffering and assembling the TUMS message 54 built from the data available from the IMU signals 63 and GSU serial data 84 and also provides the Data Formatter 81 operational control. There are other PLDs classified as systems on a chip capable of performing similar functions and are available for substitution in place of the Stratix PLD 305.

Critical interface circuits available as part of, and internal to, the PLD 305 are the asynchronous receiver transmitters (UARTs), not shown in FIG. 3. The preferred PLD 305 is internally configured with at least two UARTs.

Critical interface circuits available as part of and internal to the PLD 305 are the Interrupt Request (IRQ) ports, not shown in FIG. 3. The preferred PLD 305 is internally configured with a plurality of IRQ ports. These IRQ ports are necessary for controlling software execution as depicted in the Applications Software Flowchart that is FIG. 4.

Referring to FIG. 3, in order to maintain proper overall system operation the data formatter 81 requires a stable clock 385 that provides a clock signal 375 that is external to PLD 305. A stable clock signal must provide timing resolution that can synchronize a Flash Memory Controller 368 to a Flash Memory 365 and to any other component that operates in a time critical manner.

Referring to FIG. 3, external to PLD 305 are a Flash Memory Controller 368 and a Flash Memory 365. The configuration file for PLD 305 and the software (FIG. 4) that runs on the soft-core processor internal to PLD 305 reside in Flash Memory 365. Upon powering up the Data Formatter 81, the Flash Memory Controller 368 loads the configuration files to configure the UARTs, the IRQ ports and downloads the application software (FIG. 4) from Flash Memory 365 into PLD 305 RAM. Flash Memory 365 is directly connected to both the Flash Control device 368 and PLD 305, as illustrated by connection 380 in FIG. 3. This power up sequence is depicted as block 505 (FIG. 4) and is written by the user in the language specified by the Altera Corporation's manual describing the operational requirements for the Stratix device.

In general, an RS-232 serial converter 320 (FIG. 3) which has two input ports and two output ports, is used to convert serial data into 3.3 Volt logic level electrical signals compatible with the interface circuits internal to PLD 305.

A first input port of the RS-232 serial converter 320 (FIG. 3) receives a configuration signal 315 for conversion to a configuration output signal 330 that has a logic level suitable for further processing by a first UART internal to PLD 305. The configuration output signal 330 results in the setting of an IRQ, block 520 (FIG. 4) to halt normal application software operation and to direct the PLD 305 to execute a bootload program residing in Read-Only-Memory, block 525 (FIG. 4) to accept a new version of the application software for loading into flash memory 365 (FIG. 3). The first UART is internally configured as a configuration port.

Figure 4:
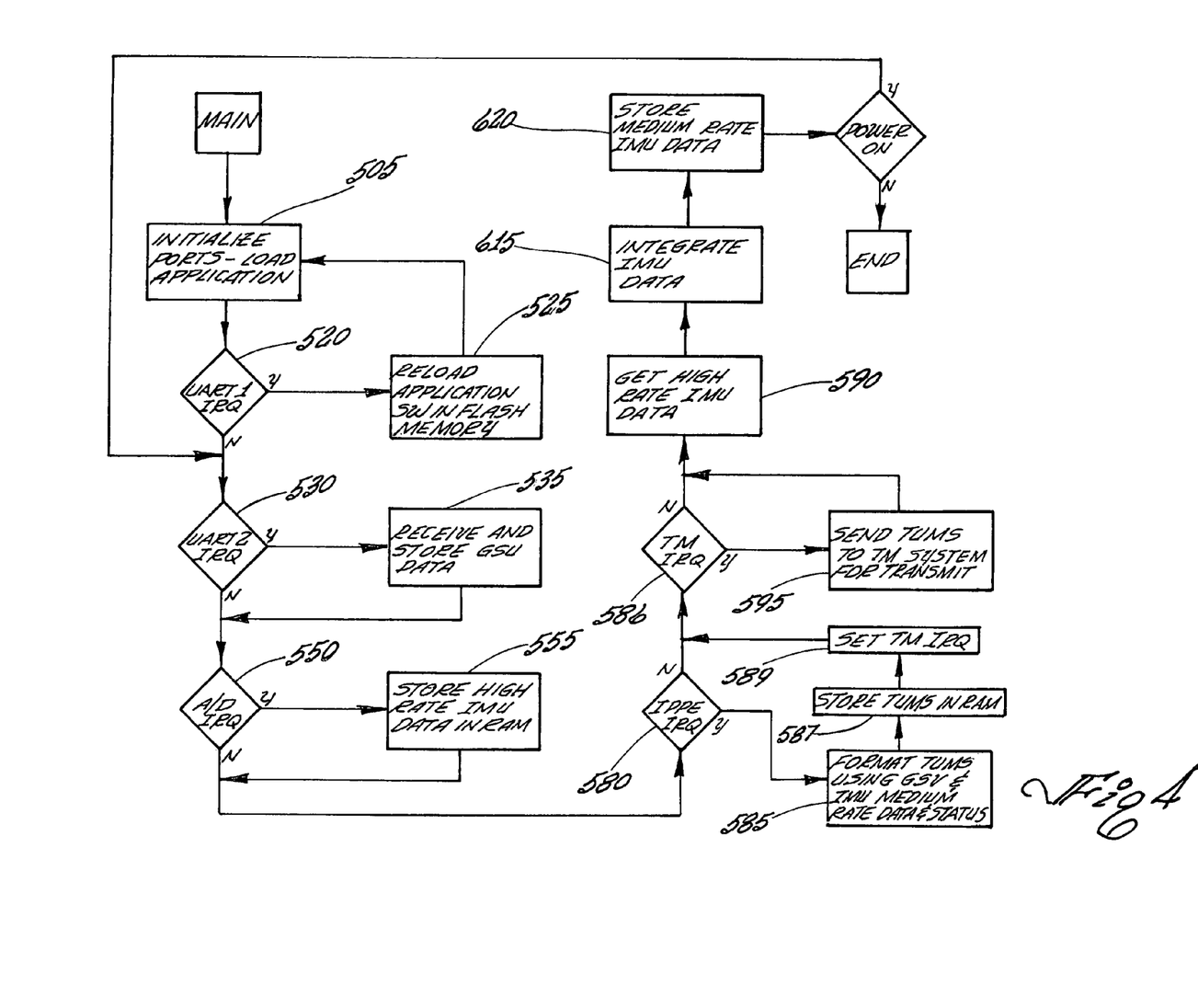
FIG. 4 is a flowchart that describes the application software processing that is used to build the TUMS.

A second input port of the RS-232 serial converter 320 receives GSU serial data 84 for conversion to a serial data output signal 325 that has a logic level suitable for further processing by a second UART internal to PLD 305. The processing step is triggered by an IRQ, block 530 (FIG. 4) set by the second UART indicating that serial data 325 is ready for further processing. Further signal processing includes the steps of receiving and storing serial data 325 into PLD 305 RAM. The steps of receiving and storing serial data 325 are also represented by block 535 (FIG. 4). The second UART is to be configured as a serial port.

Referring to FIG. 3, external to the PLD 305 is an electronic device 345 that conditions and samples the raw high data rate analog IMU signals 63 for subsequent conversion to a sixteen bit digital word 392 compatible with a parallel input port interface that is internal to PLD 305.

Electronic device 345 has an input to accept six parallel IMU signals 63 and is connects them to a signal conditioning circuit 348. The output of the signal conditioning circuit 352 is applied as an input to a sample and hold circuit 350 having six input lines. The output of the sample and hold circuit 354 are six stable analog signals suitable for input to multiplexer 355. Multiplexer 355 combines the six stable analog signals 354 into a single analog signal 356 suitable for input to an analog to digital converter (ADC) 357. ADC 357 performs a conversion of analog signal 356 to a sixteen bit digital signal 358. Digital signal 358 is connected to the input of a first-in-first-out (FIFO) buffer 360 for further processing by the internal soft-core processor of PLD 305. Further signal processing is composed of setting an IRQ, block 550 in FIG. 4 to indicate that the Analog-to-Digital (A/D) conversion is complete and to begin storing the high rate IMU messages, block 555 (FIG. 4) into PLD 305 RAM.

The preferred electronic device 345 provides a plurality of signal conditioning circuits 348, a plurality of sample and hold circuits 350, a multiplexer 355, an ADC 357, and at least one FIFO buffer 360 all contained in a single integrated circuit. Electronic device 345 is manufactured by Burr Brown, a Texas Instrument company, a leading integrated circuit manufacturer.

Referring to FIG. 3, the variable frequency signal (VFREQ) 335, occurs every GPS epoch and is correlated to GPS time. Using VFREQ 335 to time tag IMU signals 392 ensures that the IMU signals 392 are always in sync with the GSU serial data 84 received from GSU 87 (FIG. 1). GSU 87 is configured to output VFREQ 335 ensuring that VFREQ 335 is correlated to current GPS time. The preferred embodiment will have a VFREQ 335 frequency in the range of 1000 Hertz to 2000 Hertz.

Figure 5:
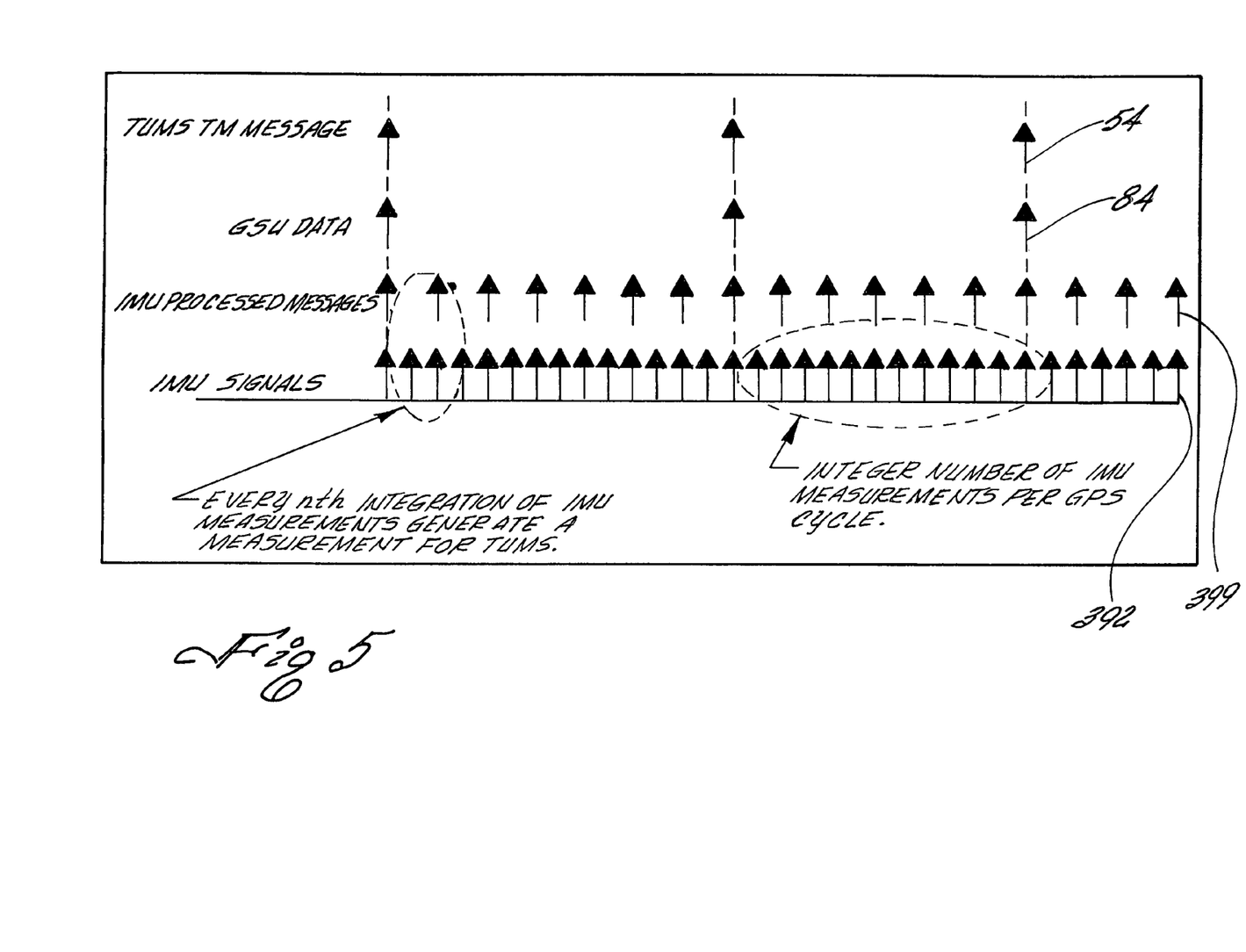
FIG. 5 is a diagram describing the timing relationship between the GPS data, IMU data and the TUMS message output.

Time correlation of the GSU and IMU data is crucial to the usefulness of TUMS TM message 54 transmitted to the ground receiving station 76. The timing between the IMU signals 63, the IMU processed messages 392, the GSU serial data 84 and the TUMS TM message 54 is represented in FIG. 5. The high data rate IMU signals are represented by the arrow heads labeled as 392 in FIG. 5, where 392 is the same 392 of FIG. 3. An integration of incoming IMU signals 392 is performed resulting in a medium rate of IMU processed messages 399 for every nth set of IMU signals. The integration of the high data rate IMU signals 392 is performed via a software algorithm running on the soft-core processor which is internal to PLD 305. The algorithm begins by first retrieving the high rate IMU data from internal PLD 305 RAM, block 590 (FIG. 4) and subjecting the retrieved IMU data to a successive mathematical integration for every integer number of high data rate IMU messages, block 615 in FIG. 4. At the completion of an integration cycle the result is an error free medium rate IMU message, illustrated by the arrowheads numbered 399 in FIG. 5. These error free medium rate IMU messages 399 are then stored in PLD 305 RAM, step 620 (FIG. 4). An integer number of high data rate IMU messages 392 are required for each GPS cycle, between epochs, where an epoch is the instant in time a GPS measurement is made. The integration accumulation performed in block 615 eliminates the IMU signals that cause a Kalman filter to reset. Elimination of Kalman filter resets is a key objective of this invention.

The IMU medium rate processed messages 399 are now available for combining with the GSU serial data 84 that arrives at the triggering of an epoch. The TUMS message 54 is assembled by combining the IMU medium rate processed messages 399 with the GSU serial data 84 and a correlation time tag determined by the algorithm running on the soft-core processor internal to PLD 305, reference FIG. 4 software flowchart. Without this proper time correlation time tag the track processing ground station 76 (FIG. 1) cannot be provided bit error free IMU data which is tightly correlated with GPS data 65 (FIG. 1) for use in updating the Kalman filter 62.

Referring to FIG. 3, a timing synchronization signal 327 that occurs every epoch (1PPE) is received from the GSU 87 (FIG. 2) and is received by PLD 305 to set an IRQ, block 580 (FIG. 4) to trigger processing in block 585, which builds and formats the TUMS message. An epoch is defined as a GPS carrier phase measurement made for a given period, about every 30 seconds. The processing steps required to build the TUMS message (block 585) are retrieve from PLD 305 RAM the GSU data, the IMU medium rate data and the correlation time tag VFREQ 335. Once the GSU, IMU and time tag are available the TUMS software combines GSU and IMU data into the TUMS message and stores the TUMS, block 587 FIG. 4 into PLD 305 RAM.

In the preferred embodiment it is necessary for the PLD 305 to ascertain proper operation of the GSU 87 (FIG. 1), the IMU 60 (FIG. 2), the power conditioner 99 and other critical components by monitoring a status signal 389 (FIG. 3) made available to a parallel input output port, resident within PLD 305. The status signal 389 is the final piece of data that is necessary to complete the TUMS message.

A complete TUMS message contains a packet header used to identify the message type and length, status words, GPS messages and IMU message and a checksum. When PLD 305 RAM contains the completely assembled TUMS message the TM IRQ, block 589, flag will be set. The Application Software detects the setting of the TM IRQ, block 586 FIG. 4, directing the retrieval of the TUMS message from internal PLD 305 RAM and sends the TUMS message, block 595, to the TM Processor 64 (FIG. 1) for telemetry transmit to the Track Processing Ground Station 76.

Referring to FIG. 1, the Track Processing Ground Station 76 extracts the data 65 to feed Kalman filter 62 resulting in an improved vehicle track and range displays 51 that accurately reflect the dynamic motion of the vehicle.

What is claimed is:

1. A telemetry message formatting system for producing correlated positional information comprising:
   (a) a global positioning system sensor unit for generating a data stream of sensor unit information corresponding to a position for a vehicle in motion, and to generate a variable frequency signal occurring every GPS epoch and correlated to GPS time;
   (b) an inertial measurement unit for generating inertial measurement unit information at a first rate corresponding to an attitude for said vehicle in motion, wherein said inertial measurement unit information comprises a plurality of inertial measurement unit signals at said first rate;
   (c) a programmable logic device having a first input for receiving said sensor unit information, a second input for receiving said inertial measurement unit information at said first rate, wherein said programmable logic is adapted to execute instructions that, when executed, cause said programmable logic to:
      time tag each of said plurality of inertial measurement unit signals at said first rate using said variable frequency signal;
      generate a processed inertial measurement unit message stream, wherein said inertial measurement unit message stream is formed of a plurality of processed inertial measurement unit messages at a second rate, wherein said second rate is slower than said first rate, wherein each of said plurality of processed inertial measurement unit messages is formed by integrating a plurality of successive of said plurality of inertial measurement unit signals at said first rate;
      generate a TUMS message stream formed of a plurality of TUMS messages, wherein each of said plurality of TUMS messages is generated at a then-current GPS epoch by combining a plurality of said plurality of processed inertial measurement unit messages at said second rate that have been generated since a last GPS epoch with said data stream of sensor unit formation at said current GPS epoch;
   (d) an interface circuit having a plurality of input ports connected to said inertial measurement unit and an output port connected to a third input of said data formatting processor;
   (e) a clock circuit for generating a stable clock signal, said clock circuit connected to a fourth input of said data formatting processor input;
   (f) a flash memory controller having a clock input for receiving said stable clock signal, a communications port for receiving control signals from said data formatting processor and status information from a flash memory device;
   (g) a differential buffer circuit located within said data formatting processor, said differential buffer circuit having an input port for receiving externally generated event markers and an output connected to said telemetry processor;
   (h) a power conditioner having an input for receiving an external power waveform from said vehicle in motion, said power conditioner providing internal power waveforms compatible with said global positioning system sensor unit, with said inertial measurement unit, with said data formatting processor, with said interface circuit, with said clock circuit, with said flash memory controller, with said flash memory device and with said differential buffer circuit;
   (i) a ground receiving station;
   (j) a kalman filter associated with said ground receiving station;
   (k) a receiving telemetry antenna associated with said ground receiving station;
   (l) a transmitting telemetry antenna associated with said telemetry processor; and
   (m) a telemetry processor adapted to combine said TUMS message stream with an event marker, wherein said event marker is an event record time tagged with GPS time and related to state change of said vehicle in motion.

2. The telemetry message formatting system of claim 1, wherein said data formatting processor is a programmable logic device having a plurality of universal asynchronous receiver transmitter ports, a plurality of parallel input output ports, an internal random access memory, an internal read only memory, a plurality of interrupt request ports and a soft core processor.

3. The telemetry message formatting system of claim 1, wherein said interface circuit is further comprised of an analog to digital converter for converting analog signals received from said inertial measurement unit to a digital signal transmitted to said data formatting processor.

4. The telemetry message formatting system of claim 1, wherein said time space position information unit message is further comprised of a plurality of fields, wherein a first field contains a status word, a second field contains said data stream of sensor unit information time correlated with said inertial measurement unit information residing in a third field.

5. The telemetry message formatting system of claim 1, wherein said variable frequency signal is in the range of 1000 Hertz to 2000 Hertz.

6. The telemetry message formatting system of claim 1, wherein said time space position information unit message is compatible with a packet telemetry system.

7. A telemetry message formatting system for producing correlated positional information comprising:
   (a) a sensor unit adapted to generate a data stream of information relative to an instantaneous position for a vehicle in motion derived from GPS information obtained from global positioning satellites, and to generate a variable frequency signal correlated to GPS time at a plurality of GPS epochs;
   (b) an inertial measurement unit attached to said vehicle in motion, said inertial measurement unit producing attitude information corresponding to instantaneous angular and linear accelerations of said vehicle in motion, said attitude information comprises a plurality of inertial measurement unit signals at a first rate;
   (c) a data formatting logic device adapted to:
      time tag each of said plurality of inertial measurement unit signals at said first rate using said variable frequency signal;
      generate a processed inertial measurement unit message stream, wherein said inertial measurement unit message stream is formed of a plurality of processed inertial measurement unit messages at a second rate, wherein said second rate is slower than said first rate, wherein each of said plurality of processed inertial measurement unit messages is formed by integrating a plurality of successive of said plurality of inertial measurement unit signals at said first rate; and
      generate a TUMS message stream formed of a plurality of TUMS messages, wherein each of said plurality of TUMS messages is generated at a then-current of said plurality of GPS epochs by combining a plurality of said plurality of processed inertial measurement unit messages at said second rate that have been generated since a last of said plurality of GPS epochs with said data stream of sensor unit formation at said then-current of said plurality of GPS epochs;

(d) an electronic interface for converting analog signals received from said inertial measurement unit to a digital word supplied to said data formatting logic device;

(e) a variable frequency signal output by said sensor unit for time tagging said attitude information sent to said data formatting logic device from said inertial measurement unit;

(f) a flash memory controller for reading applications software from a flash memory and writing said applications software to a random access memory which is internal to said data formatting logic device;

(g) a differential buffer circuit having an input for receiving and buffering an event marker, said differential buffer having an output connecting said differential buffer circuit to said telemetry processor;

(h) a system clock for providing synchronization of time critical operations within said telemetry message formatting system;

(i) a power conditioner for converting vehicle power waveforms to a plurality of power waveforms to operate said sensor unit, said inertial measurement unit, said data formatting processing logic device, said electronic interface, said system clock, said flash memory controller and said differential buffer circuit; and (j) a ground receiving station;

(k) a kalman filter associated with said ground receiving station;

(l) a receiving telemetry antenna associated with said ground receiving station;

(m) a transmitting telemetry antenna associated with said telemetry processor; and (n) a telemetry processor adapted to combine said TUMS message stream with an event marker, wherein said event marker is an event record time tagged with GPS time and related to state change of said vehicle in motion.

8. The telemetry message formatting system of claim 7, wherein said data formatting logic device is a programmable system on a chip having a plurality of universal asynchronous receiver transmitter circuits, a plurality of parallel input output circuits, said internal random access memory, an internal read only memory, a plurality of interrupt request circuits each of which are connected to a central processing unit.

9. The telemetry message formatting system of claim 7, wherein said electronic interface circuit is further comprised of a sample and hold input circuit for receiving high data rate analog signals from said inertial measurement unit, said sample and hold circuit having a digital signal output to provide error free inertial measurement data to said data formatting logic device.

10. The telemetry message formatting system of claim 7, wherein said time space position information unit message is further comprised of a first data structure containing status of electronic components within said telemetry message formatting system, a second data structure containing said data stream of information time correlated with said attitude information residing in a third data structure.

11. The telemetry message formatting system of claim 7, wherein said variable timing frequency is in a range of 1000 Hertz to 2000 Hertz.

12. The telemetry message formatting system of claim 7, wherein said data formatting logic device mathematically integrates high data rate inertial measurement unit messages to obtain error free medium data rate inertial measurement unit messages.

13. The telemetry message formatting system of claim 7, wherein said time space position information unit message is compatible with a packet telemetry system.

* * * * *